United States Patent
Adir et al.

(10) Patent No.: US 11,349,859 B2
(45) Date of Patent: May 31, 2022

(54) METHOD FOR PRIVACY PRESERVING ANOMALY DETECTION IN IOT

(71) Applicant: International Business Machines Corporation, Armonk, NY (US)

(72) Inventors: Allon Adir, Kiryat Tivon (IL); Ehud Aharoni, Kfar Saba (IL); Lev Greenberg, Haifa (IL); Omri Soceanu, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 16/695,251

(22) Filed: Nov. 26, 2019

(65) Prior Publication Data

US 2021/0160264 A1 May 27, 2021

(51) Int. Cl.
*H04L 9/00* (2022.01)
*H04L 9/40* (2022.01)

(52) U.S. Cl.
CPC ........ *H04L 63/1425* (2013.01); *H04L 63/123* (2013.01); *H04L 63/1416* (2013.01); *H04L 63/1433* (2013.01); *H04L 63/20* (2013.01)

(58) Field of Classification Search
USPC ....................................................... 726/22
See application file for complete search history.

(56) References Cited

U.S. PATENT DOCUMENTS

| | | | |
|---|---|---|---|
| 10,375,100 B2* | 8/2019 | Grayson | H04W 12/12 |
| 2010/0034102 A1* | 2/2010 | Wang | H04L 43/0876 |
| | | | 370/252 |
| 2018/0174065 A1 | 6/2018 | Debnath et al. | |
| 2018/0191867 A1 | 7/2018 | Siebel et al. | |
| 2018/0357556 A1 | 12/2018 | Rai et al. | |
| 2020/0304393 A1* | 9/2020 | Sampath | H04L 41/147 |

\* cited by examiner

*Primary Examiner* — Christopher J Brown
(74) *Attorney, Agent, or Firm* — Gregory J. Kirsch

(57) ABSTRACT

Embodiments may provide techniques to detect cyber-security events in IoT data traffic that provide improved detection accuracy and preservation of privacy. For example, in an embodiment, a method may be implemented in a computer comprising a processor, memory accessible by the processor, and computer program instructions stored in the memory and executable by the processor, the method may comprise collecting a plurality of messages to and from at least one device, extracting metadata features from the collected plurality of messages, generating a time window, determining additional features based on the extracted metadata features present during the time window, detecting behavioral patterns of the at least one device based on the collected plurality of messages, clustering the determined additional features and the detected behavioral patterns present during the time window, and detecting at least one anomaly or type of anomaly using the clustered determined additional features and the detected behavioral patterns.

15 Claims, 4 Drawing Sheets

METHOD FOR PRIVACY PRESERVING ANOMALY DETECTION IN IOT

BACKGROUND

The present invention relates to techniques to detect cyber-security events in IoT data traffic that provide improved detection accuracy and preservation of privacy.

As more Internet-of-Thing (IoT) devices are being connected to the web, the need to detect cyber-security events becomes more prominent. Network traffic by IoT devices possesses certain unique characteristics. Leveraging these characteristics allows defenders to detect anomalous deviations. For example, some conventional techniques may detect anomalies in data generated from sensors using the data and the context of the data. Conventional techniques may filter the data, perform statistical analysis on the data, and analyze header fields from packets carrying the data. However, such conventional techniques still leave room for improvement in terms of accuracy of detection, as well as preservation of privacy.

Accordingly, a need arises for techniques to detect cyber-security events in IoT data traffic that provide improved detection accuracy and preservation of privacy.

SUMMARY

Embodiments may provide techniques to detect cyber-security events in IoT data traffic that provide improved detection accuracy and preservation of privacy. Embodiments may use temporal hierarchies such as day of the week, time of day, and part of hour, to model metadata information and cluster similar behaving devices. Embodiments may use limited, discrete, message sizes, to allow for tight behavioral modeling. Embodiments may identify the relatively small number of distinct message sizes (each surrounded by a low variance message size distribution) to provide for more accurate anomaly detection, as opposed to a high variance Gaussian distribution of message sizes. The very task-specific nature of these devices also allows defenders to identify distinct sequences from which any deviation may count as an anomaly.

For example, in an embodiment, a method may be implemented in a computer comprising a processor, memory accessible by the processor, and computer program instructions stored in the memory and executable by the processor, the method may comprise collecting, at the computer system, a plurality of messages to and from at least one device, extracting, at the computer system, metadata features from the collected plurality of messages, generating, at the computer system, a time window, determining, at the computer system, additional features based on the extracted metadata features present during the time window, detecting, at the computer system, behavioral patterns of the at least one device based on the collected plurality of messages, clustering, at the computer system, the determined additional features and the detected behavioral patterns present during the time window, and detecting, at the computer system, at least one anomaly or type of anomaly using the clustered determined additional features and the detected behavioral patterns.

In embodiments, the extracted metadata features may comprise at least one of an ID of the at least one device associated with each message, a message size of each message, a communication direction of each message, and communication time of each message and the additional features comprise at least one of temporal aspects, including at least one of intervals or frequencies with which a device sends messages and average periods or frequencies of messages, temporal hierarchies, including at least one of day of week, time of day, and part of hour, sequences of messages, including at least one of patterns of message length, message type, device IDs of specific devices, type of device, and class of device. A size of the time window may be selected based on a frequency of communication of the at least one message, and to allow large messages to be collected in single time window. The method may further comprise collecting, at the computer system, a plurality of messages to and from at a plurality of devices, detecting, at the computer system, behavioral patterns of at least one type of device based on the collected plurality of messages, and detecting, at the computer system, at least one anomaly using the detected behavioral patterns of the at least one type of device. Determining extracted metadata features present during the time window may comprise at least one of counting a number of messages to and from the at least one device during the time window and generating a histogram of different message sizes during the time window. The clustering comprise at least one of K-means clustering and hierarchical clustering. The detecting at least one anomaly may comprise at least one of building, at the computer system, a model of historical message size histograms of the at least one device and its cluster, wherein the model has a mixed normal distribution, and detecting an anomaly when a size of a message deviates from the mixed normal distribution of the model, building, at the computer system, a model of historical message counts of the at least one device and its cluster, wherein the model has a normal distribution, and detecting an anomaly when a message count of the at least one device deviates from a normal distribution of the model, and building, at the computer system, a sequence model of metadata features based on historical message size sequences of the at least one device and its cluster, and detecting an anomaly based on a sequence of messages of the at least one device.

In an embodiment, a system may comprise a processor, memory accessible by the processor, and computer program instructions stored in the memory and executable by the processor to perform collecting a plurality of messages to and from at least one device, extracting metadata features from the collected plurality of messages, generating a time window, determining additional features based on the extracted metadata features present during the time window, detecting behavioral patterns of the at least one device based on the collected plurality of messages, clustering the determined additional features and the detected behavioral patterns present during the time window, and detecting at least one anomaly or type of anomaly using the clustered determined additional features and the detected behavioral patterns.

In an embodiment, a computer program product may comprise a non-transitory computer readable storage having program instructions embodied therewith, the program instructions executable by a computer, to cause the computer to perform a method that may comprise collecting, at the computer system, a plurality of messages to and from at least one device, extracting, at the computer system, metadata features from the collected plurality of messages, generating, at the computer system, a time window, determining, at the computer system, additional features based on the extracted metadata features present during the time window, detecting, at the computer system, behavioral patterns of the at least one device based on the collected plurality of messages, clustering, at the computer system, the determined additional features and the detected behavioral patterns present during the time window, and detecting, at the computer system, at least one anomaly or type of anomaly using the clustered determined additional features and the detected behavioral patterns.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide techniques to detect cybersecurity events in IoT data traffic that provide improved detection accuracy and preservation of privacy. Embodiments may use temporal hierarchies such as day of the week, time of day, and part of hour, to model metadata information and cluster similar behaving devices. Embodiments may use limited, discrete, message sizes, to allow for tight behavioral modeling. Embodiments may identifying the relatively small number of distinct message sizes (each surrounded by a low variance message size distribution) to provide for more accurate anomaly detection, as opposed to a high variance Gaussian distribution of message sizes. The very task-specific nature of these devices also allows defenders to identify distinct sequences from which any deviation may count as an anomaly.

Figure 1:
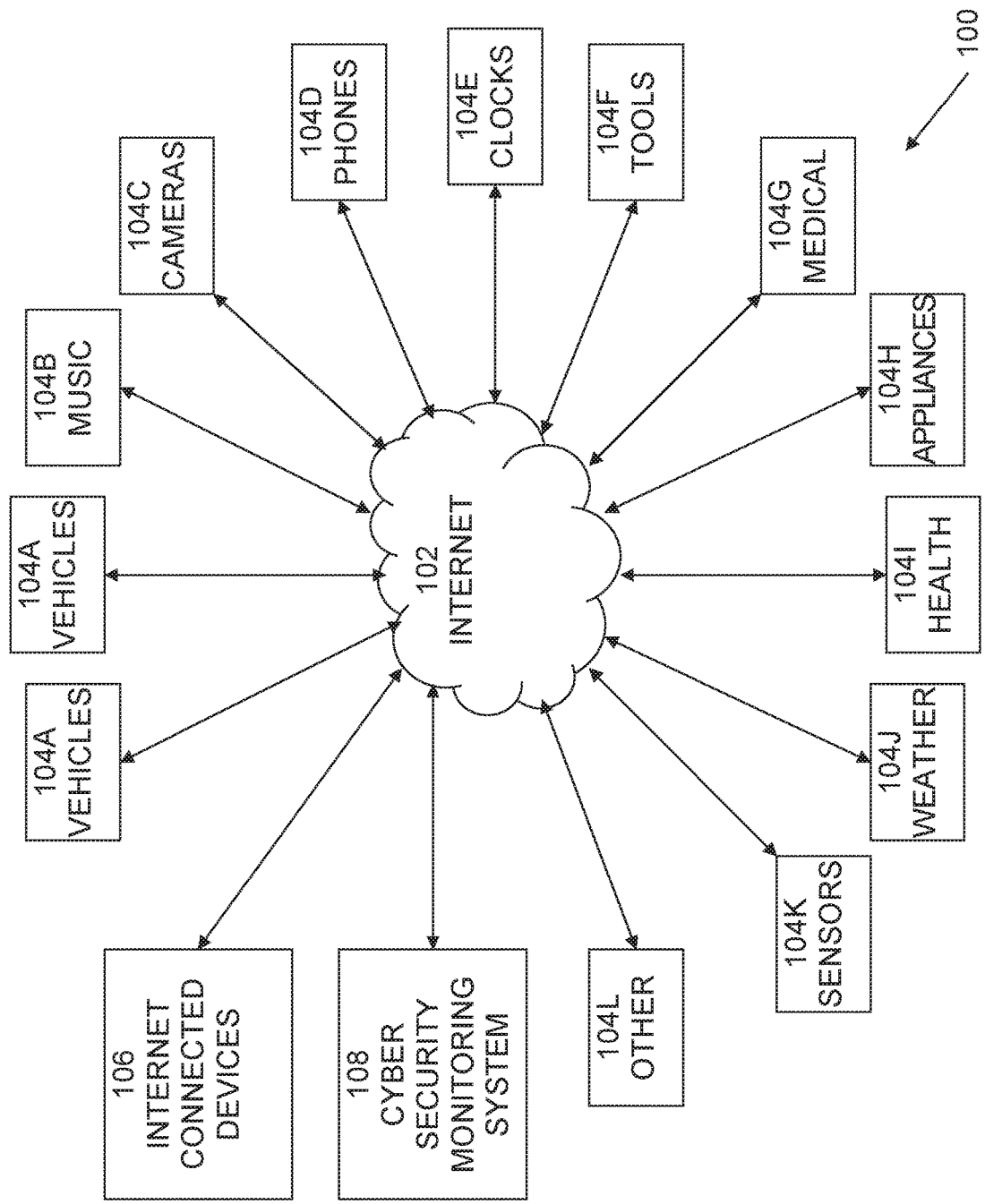
FIG. 1 illustrates an exemplary diagram of an Internet-of-Things (IoT) system in which embodiments of the present systems and methods may be implemented.

An exemplary block diagram of an Internet-of-Things (IoT) system 100 is shown in FIG. 1. In this example, a plurality of IoT devices 104A-L is communicatively connected via Internet 102. IoT devices 104A-L may include devices such as vehicles 104A, music and other audio devices 104B, cameras 104C, phones, smartphones, tablets, and other communication and computing devices 104D, clocks and other timing devices 104E, tools 104F, medical devices 104G, appliances 104H, health devices 104I, weather sensors 104J, other sensors 104K, and other devices 104L. IoT devices 104A-L communicate with any Internet connected devices 106, which are communicatively connected to Internet 102, including other IoT devices, client computer systems, server computer systems, the cloud, etc. Cybersecurity monitoring system 108 may monitor communication traffic to and from IoT devices 104A-L and may detect and respond to cybersecurity events. For example, cybersecurity monitoring system 108 may detect cybersecurity events based on data traffic anomalies.

Embodiments may provide IoT anomaly detection based on any non-private parts of each messages, such as meta data and/or any other non-private parts of the communication messages to and from IoT devices 104A-L. In embodiments, the messages may utilize any public or proprietary, standard or custom message protocol or format. For example, messages may utilize IETF's Constrained Application Protocol, ZeroMQ, MQTT, etc.

In embodiments, directly collected features, such as non-private parts of messages, for example, the meta data of the IoT messages, may be collected. Such meta data may include, for example, date and/or time of communication of a message, a message size or length, an ID of the IoT device, a device type, such as a camera, sensor, etc., a communication direction, etc. In the case of a private device ID, a hash of the private ID or another unique but anonymous identifier may be generated. This keeps private information private, but allows unique identification of each device using the non-private hash or other identifier. Additional features may be determined or computed from the collected features. For example, temporal aspects, such as intervals or frequencies with which a device sends messages, average periods or frequencies of messages, sequences of messages, such as patterns of message length, message type, device IDs (as hashed) of specific devices, type of device, class of device, etc. Embodiments may provide a number of methods to detect anomalies based on these features.

Typically, IoT communication messages may exhibit specific and unique patterns of behavior that may result from particular processes or functions of the IoT device. Such behavior of IoT devices is typically different than the behavior exhibited by communication messages of non-IoT devices. Embodiments may provide IoT anomaly detection based on these IoT patterns of behavior and/or deviations from such patterns. For example, messages of typical IoT devices may exhibit very regular patterns of second level features. For example, IoT devices may communicate messages with particular temporal aspects, such as regular time intervals or frequencies or average intervals or frequencies, particular patterns of message length, particular sequences of messages based on features such as message type, device ID (as hashed), device type, etc. In embodiments, patterns of behavior of devices may be detected and/or trained and deviations from such patterns may indicate an anomaly.

In embodiments, IoT messages may be collected in any way, such as monitoring of network traffic at various points in the network, for example, at network routers, hubs, gateways, etc., as well as at points of origin or destination of network traffic.

It is to be noted that most processing that may be performed with device clusters may also be done with device types. Both are groupings of devices. The devices in the cluster may be gathered using analytics by monitoring their common behavior, whereas gathering by device type may be done simply by considering the given type. Since the device may be anonymous (because its private ID may be hashed) then the device type, which is not private, may be used, and also clusters may be automatically created based on analyzing non-private meta data as described herein.

Figure 2:
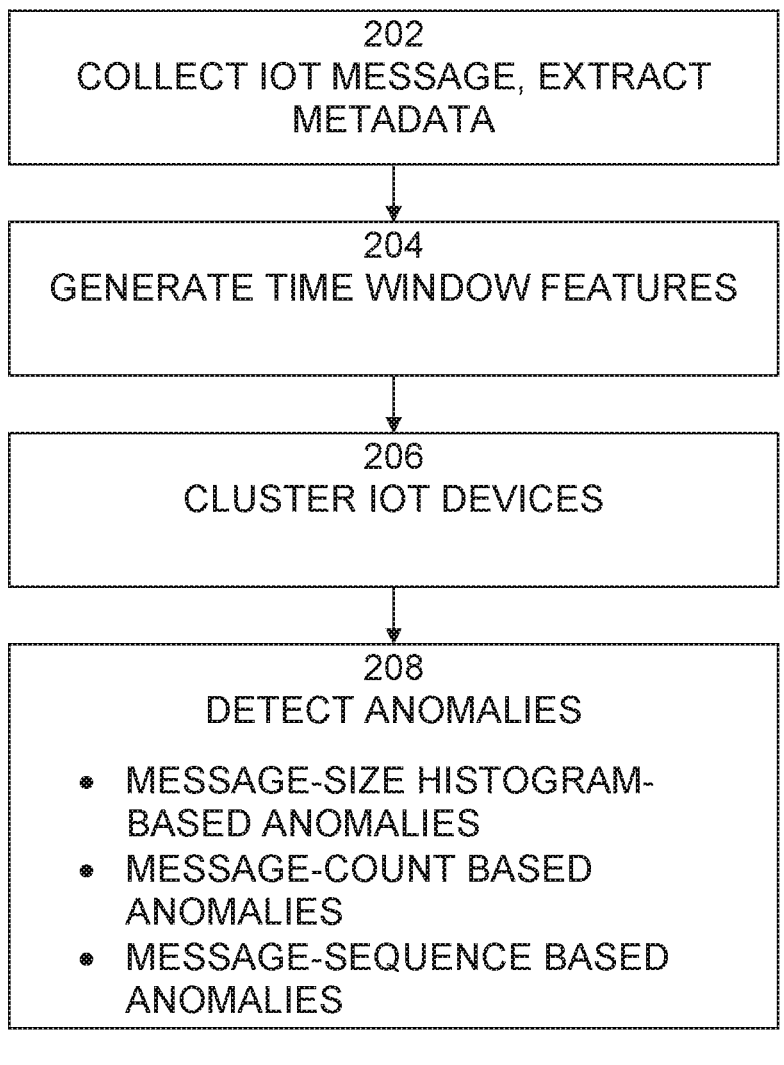
FIG. 2 is an exemplary flow diagram of a process of IoT anomaly detection according to embodiments of the present techniques.
Figure 3:
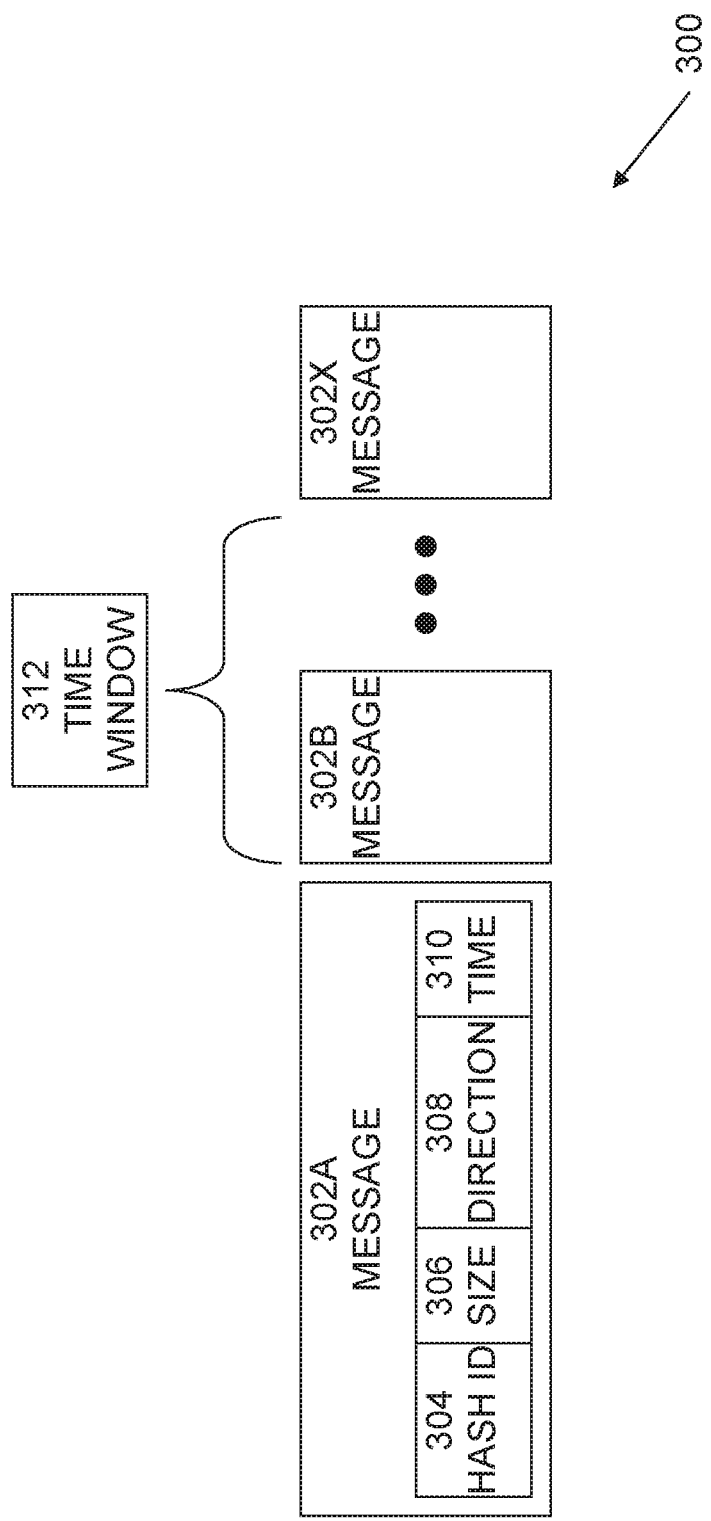
FIG. 3 is an exemplary illustration of an IoT message stream, in accordance with embodiments of the present systems and methods.

An exemplary flow diagram of a process 200 of IoT anomaly detection is shown in FIG. 2. It is best viewed in conjunction with FIG. 3, which is an exemplary illustration of an IoT message stream 300. Process 200 may begin at 202, in which one or more IoT messages 302A-X may be collected and metadata features, such as device hash ID 304, message size 306, communication direction 308, and communication time 310, may be extracted. In embodiments, the collection and extraction may be done by the owner of the data, to ensure that no private data is exposed. While extraction of, for example, message size 306, communication direction 308, and communication time 310 may be straightforward, for collection of the device hash ID 304, a number of techniques may be used, such as reversible key-based encryption of the device ID and lookup tables of ID hash codes. At 204, after the metadata features are extracted, a number of second level time-window 312 based features may be computed or generated for each IoT device. The size of time window 312 may be selected depending on the frequency of the communication to allow a large enough number of messages to be collected in the time window. Different time windows may be selected for different features.

In embodiments, a basic computed or generated time window feature may be the total number of messages in time window 312, the average number of messages in each time window 312. For example, the number of messages an IoT device sends/receives in each 10-minute window may be counted. In embodiments, a more advanced computed or generated time-window feature may be aggregated features, such as a histogram of different message sizes in time window 312. For example, the number of messages an IoT device sends/receives each 10-minute window may be counted for each observed message size. It is to be noted that the 10-minute time window is merely an example. Embodiments may use time windows of any length necessary to detect a useful number of messages during the time window. For example, in embodiments, zero or only a few messages per time window may be fewer than is useful, while hundreds or thousands of messages per time window may be greater than is useful. In embodiments, time windows may be selected to detect, for example, about 10 to 100 messages per time window. However, this is only an example. The actual time window may be selected to detect any number of messages as desired.

A model of the historical behavior of each device may be generated, for example, tracking message times, sizes, sequence patterns, etc. In embodiments, each device may be identified by it actual device ID, while in embodiments in which the actual device ID is to be kept private, each device may be identified by anonymized information that uniquely identifies each device. For example, a device may be identified using a hash tag generated by running the device ID through a hash function.

At 206, the IoT devices may be clustered to detect groups of similar devices. Embodiments may collect a long enough history of computed or generated time-window features to find groups of IoT devices that behave similarly. For example, a week or a month of a total number of messages may be collected and a clustering algorithm, such as K-means or hierarchical clustering (hierarchical cluster analysis), may be applied to find groups of IoT devices that behave similarly. For example, similar types of devices, such as cameras, etc., may behave similarly and thus, may be clustered together.

Accordingly, in embodiments, individual device behavior patterns may be used to detect behavioral anomalies for that device. Further, in embodiments, aggregated/clustered device behavior patterns for groups of devices may be used to detect behavioral anomalies for one or more devices in a cluster.

At 208, anomalies may be detected using the collected and clustered message metadata. Models may be built using the data to model the behavior of individual devices, types of devices, and/or clusters of devices. Such models may then be used to detect anomalies in behavior of individual devices, types of devices, and/or clusters of device devices. For example, given a model of behavior of an individual device, anomalous behavior of the device may be detected based on deviation from the modeled behavior. Given a model of behavior of a particular type of device, such as a camera, etc., anomalous behavior of one or more devices may be detected based on deviation from the modeled behavior. Likewise, given a model of behavior of a cluster of devices, anomalous behavior of one or more devices, or of the whole cluster, may be detected based on deviation from the modeled behavior. Embodiments may use anomaly detection techniques such as:

Message-size histogram-based anomalies—for this, a model may be built of historical message size histograms of the IoT device, device type, and/or its cluster. Typically, the distribution will be similar to a multimodal mixed normal distribution with the number of most frequent messages sizes as intervals. Typically, histograms include frequent points separated by regions of no points. Accordingly, the resulting distribution may be mixed normal distribution, which is a mixture of dense points. In embodiments, an anomaly may be detected when the specific message size is far away from the frequent intervals, for example, more than 3 sigma.

Message-count based anomalies—for this, a model may be built of historical counts of the IoT device and its cluster. Embodiments may apply both a simple model, such as an estimated mean and standard deviation of historical behavior, or more advanced modeling that is based on temporal hierarchies such as day of the week, time of day, and part of hour, etc., may be applied. In embodiments, an anomaly may be detected when a message count of the IoT device is far away from the frequent intervals. In embodiments, more advanced time series techniques for anomaly detection may be applied, where the models may be trained on the count signal of the IoT device and its cluster.

Message-sequence based anomalies—for this, a model may be built using 1st level features to build a sequence model of IoT devices. The model may be trained on the historical message sizes sequences of the IoT device and its cluster. Various sequence-based techniques may be used here, such as Markov-based methods and deep learning methods such as Long short-term memory (LSTM).

Figure 4:
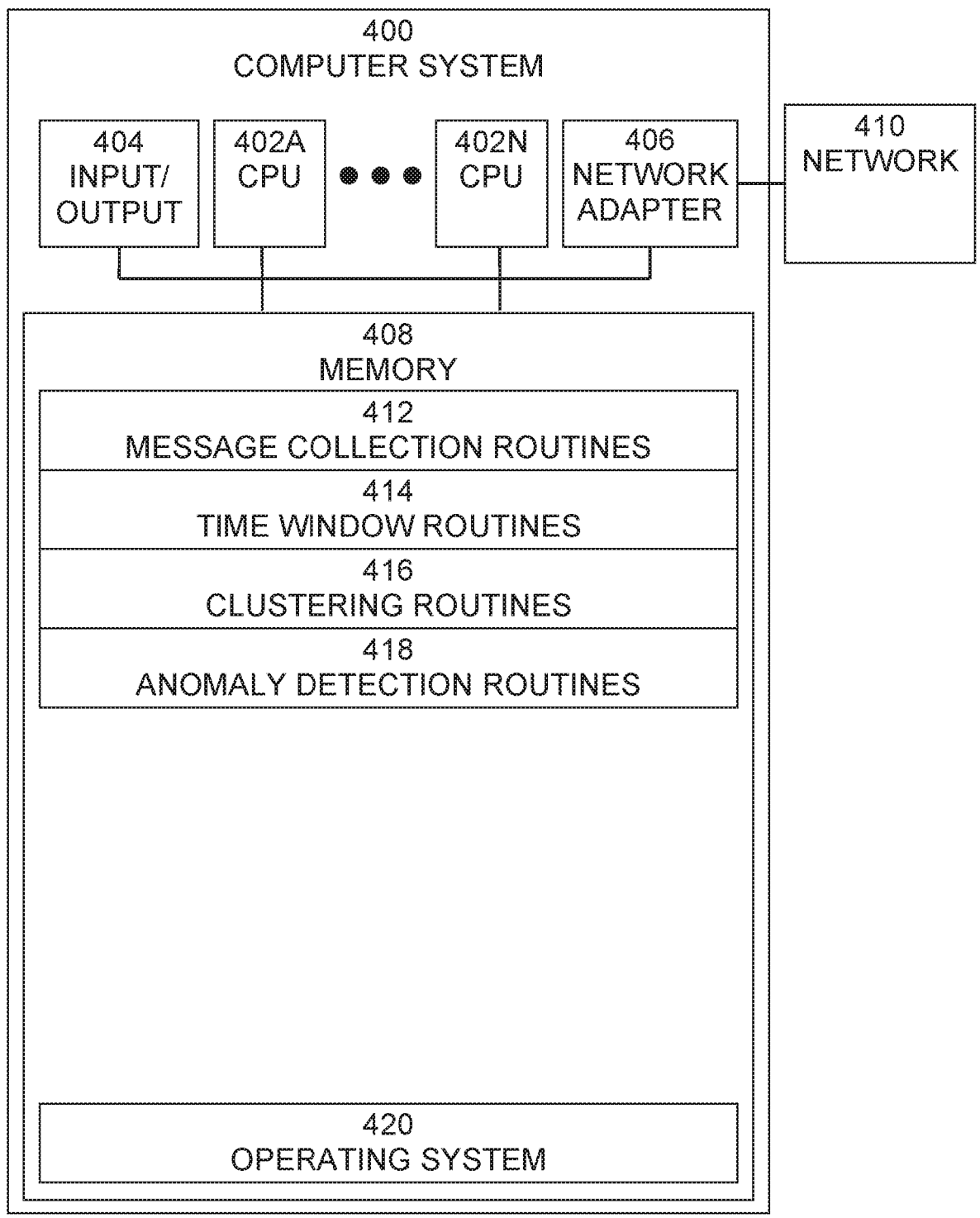
FIG. 4 is an exemplary block diagram of a computer system, in which processes involved in the embodiments described herein may be implemented.

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 4, memory 408 may include message collection routines 412, time window routines 414, clustering routines 416, anomaly detection routines 418, and operating system 420. Message collection routines 412 may include software routines to collect IoT messages, as described above. Time window routines 414 may include software routines to generate time window features, as described above. Clustering routines 416 may include software routines to generate clusters of IoT devices to detect groups of similar devices, as described above. Anomaly detection routines 418 may include software routines to detect anomalies using the collected and clustered message metadata, as described above. Operating system 420 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer comprising a processor, memory accessible by the processor, and computer program instructions stored in the memory and executable by the processor, the method comprising:
    collecting, at the computer system, a plurality of messages to and from at least one device;
    extracting, at the computer system, metadata features from the collected plurality of messages, wherein the extracted metadata features comprise at least one of
        an ID of the at least one device associated with each message,
        a message size of each message,
        a communication direction of each message, and
        a communication time of each message,
    generating, at the computer system, a time window, wherein a size of the time window is selected based on a frequency of communication of the plurality of messages, and to allow a useful number of messages to be collected in a single time window;
    determining, at the computer system, additional features based on the extracted metadata features present during the time window, wherein the additional features comprise at least one of
        temporal aspects including intervals or frequencies with which a device sends messages, and average periods or frequencies of messages,
        temporal hierarchies, including at least one of day of week, time of day, and part of hour, and
        sequences of messages, including at least one of patterns of message length, message type, device IDs of specific devices, type of device, and class of device,
        and wherein determining extracted metadata features present during the time window comprises at least one of counting a number of messages to and from the at least one device during the time window and generating a histogram of different message sizes during the time window;
    detecting, at the computer system, behavioral patterns of the at least one device based on the collected plurality of messages;
    clustering, at the computer system, the determined additional features and the detected behavioral patterns present during the time window, wherein the clustering comprises at least one of K-means clustering and hierarchical clustering;
    building, at the computer system, a mixed normal distribution model of message patterns, wherein the building a mixed normal distribution model to help detect at least one anomaly comprises at least one of:

building, at the computer system, a model of historical message size histograms of the at least one device and its cluster, wherein the model has a mixed normal distribution, and detecting an anomaly when a size of a message deviates from the mixed normal distribution of the model; and building, at the computer system, a model of historical message counts of the at least one device and its cluster, wherein the model has a normal distribution, and detecting an anomaly when a message count of the at least one device deviates from the normal distribution of the model; and detecting, at the computer system, at least one anomaly or type of anomaly using the clustered determined additional features, the model, and the detected behavioral patterns.

2. The method of claim 1, further comprising:

collecting, at the computer system, a plurality of messages to and from a plurality of devices;

detecting, at the computer system, behavioral patterns of at least one type of device based on the collected plurality of messages; and detecting, at the computer system, at least one anomaly using the detected behavioral patterns of the at least one type of device.

3. The method of claim 1, wherein each device associated with each message is assigned a unique but anonymous identifier in place of the device ID.

4. The method of claim 3, wherein the unique but anonymous identifier is determined by a hash function of the device ID.

5. The method of claim 1, wherein the model of historical message size or the model of historical message counts comprises a deep learning model trained on historical data of the at least one device and of its cluster, and wherein the historical data comprises at least one of message sizes and message sequences.

6. A system comprising a processor, memory accessible by the processor, and computer program instructions stored in the memory and executable by the processor to perform:

collecting a plurality of messages to and from at least one device;

extracting metadata features from the collected plurality of messages, wherein the extracted metadata features comprise at least one of
  an ID of the at least one device associated with each message,
  a message size of each message,
  a communication direction of each message, and
  a communication time of each message, generating a time window, wherein a size of the time window is selected based on a frequency of communication of the plurality of messages, and to allow a useful number of messages to be collected in a single time window;

determining additional features based on the extracted metadata features present during the time window, wherein the additional features comprise at least one of
  temporal aspects including intervals or frequencies with which a device sends messages, and average periods or frequencies of messages,
  temporal hierarchies, including at least one of day of week, time of day, and part of hour, and
  sequences of messages, including at least one of patterns of message length, message type, device IDs of specific devices, type of device, and class of device, and wherein determining extracted metadata features present during the time window comprises at least one of counting a number of messages to and from the at least one device during the time window and generating a histogram of different message sizes during the time window;

detecting behavioral patterns of the at least one device based on the collected plurality of messages;

clustering the determined additional features and the detected behavioral patterns present during the time window, wherein the clustering comprises at least one of K-means clustering and hierarchical clustering;

building a mixed normal distribution model of message patterns, wherein the building a mixed normal distribution model to help detect at least one anomaly comprises at least one of:
  building a model of historical message size histograms of the at least one device and its cluster, wherein the model has a mixed normal distribution, and detecting an anomaly when a size of a message deviates from the mixed normal distribution of the model; and
  building a model of historical message counts of the at least one device and its cluster, wherein the model has a normal distribution, and detecting an anomaly when a message count of the at least one device deviates from the normal distribution of the model; and detecting at least one anomaly or type of anomaly using the clustered determined additional features, the model, and the detected behavioral patterns.

7. The system of claim 6, further comprising:

collecting a plurality of messages to and from a plurality of devices;

detecting behavioral patterns of at least one type of device based on the collected plurality of messages; and detecting at least one anomaly using the detected behavioral patterns of the at least one type of device.

8. The system of claim 6, wherein each device associated with each message is assigned a unique but anonymous identifier in place of the device ID.

9. The system of claim 8, wherein the unique but anonymous identifier is determined by a hash function of the device ID.

10. The system of claim 6, wherein the model of historical message size or the model of historical message counts comprises a deep learning model trained on historical data of the at least one device and of its cluster, and wherein the historical data comprises at least one of message sizes and message sequences.

11. A computer program product comprising a non-transitory computer readable storage having program instructions embodied therewith, the program instructions executable by a computer, to cause the computer to perform a method comprising:

collecting a plurality of messages to and from at least one device;

extracting metadata features from the collected plurality of messages, wherein the extracted metadata features comprise at least one of
  an ID of the at least one device associated with each message,
  a message size of each message,
  a communication direction of each message, and
  a communication time of each message, generating a time window, wherein a size of the time window is selected based on a frequency of communication of the plurality of messages, and to allow a useful number of messages to be collected in a single time window;

determining additional features based on the extracted metadata features present during the time window, wherein the additional features comprise at least one of
- temporal aspects including intervals or frequencies with which a device sends messages, and average periods or frequencies of messages,
- temporal hierarchies, including at least one of day of week, time of day, and part of hour, and
- sequences of messages, including at least one of patterns of message length, message type, device IDs of specific devices, type of device, and class of device, and wherein determining extracted metadata features present during the time window comprises at least one of counting a number of messages to and from the at least one device during the time window and generating a histogram of different message sizes during the time window;

detecting behavioral patterns of the at least one device based on the collected plurality of messages;

clustering the determined additional features and the detected behavioral patterns present during the time window, wherein the clustering comprises at least one of K-means clustering and hierarchical clustering;

building a mixed normal distribution model of message patterns, wherein the building a mixed normal distribution model to help detect at least one anomaly comprises at least one of:
- building a model of historical message size histograms of the at least one device and its cluster, wherein the model has a mixed normal distribution, and detecting an anomaly when a size of a message deviates from the mixed normal distribution of the model; and
- building a model of historical message counts of the at least one device and its cluster, wherein the model has a normal distribution, and detecting an anomaly when a message count of the at least one device deviates from the normal distribution of the model; and detecting at least one anomaly or type of anomaly using the clustered determined additional features, the model, and the detected behavioral patterns.

12. The computer program product of claim 11, further comprising:
- collecting a plurality of messages to and from a plurality of devices;
- detecting behavioral patterns of at least one type of device based on the collected plurality of messages; and
- detecting at least one anomaly using the detected behavioral patterns of the at least one type of device.

13. The computer program product of claim 11, wherein each device associated with each message is assigned a unique but anonymous identifier in place of the device ID.

14. The computer program product of claim 13, wherein the unique but anonymous identifier is determined by a hash function of the device ID.

15. The computer program product of claim 11, wherein the model of historical message size or the model of historical message counts comprises a deep learning model trained on historical data of the at least one device and of its cluster, and wherein the historical data comprises at least one of message sizes and message sequences.

* * * * *